United States Patent

Millsap

[15] 3,642,290

[45] Feb. 15, 1972

[54] COMPOSITE ROD WIPER

[72] Inventor: Norman E. Millsap, Salt Lake City, Utah

[73] Assignee: Parker-Hannifin Corporation, Cleveland, Ohio

[22] Filed: Feb. 5, 1970

[21] Appl. No.: 8,855

[52] U.S. Cl..................................277/24, 277/101, 277/178
[51] Int. Cl............................................................F16j 15/32
[58] Field of Search....................................277/101, 178, 24

[56] References Cited

FOREIGN PATENTS OR APPLICATIONS 445,219 10/1967 Switzerland...........................277/178

Primary Examiner—Robert I. Smith
Attorney—Diller, Brown, Ramik & Holt

[57] ABSTRACT

This disclosure relates to a rod wiper which is a component of a monolithic assembly including a backup washer. The backup washer is formed of relatively hard material which resists extrusion while the rod wiper is formed of a softer, more resilient abrasion-resistant material providing optimum wiping action. A bond between the backup washer and the rod wiper is no weaker than the lowest physical property of either.

8 Claims, 3 Drawing Figures

PATENTED FEB 15 1972 3,642,290
FIG. 1
FIG. 2
FIG. 3
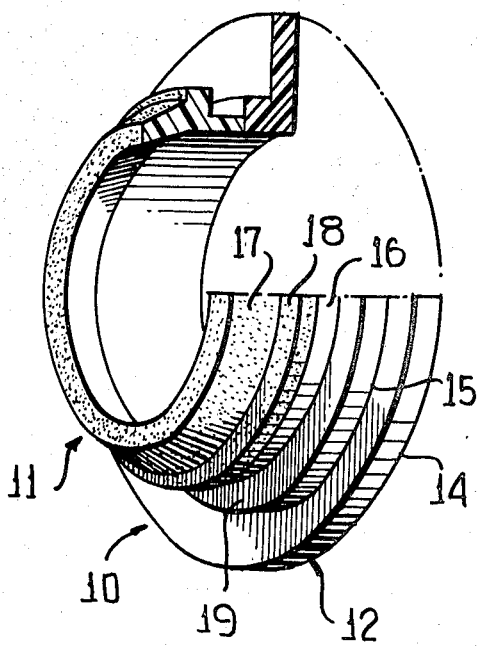
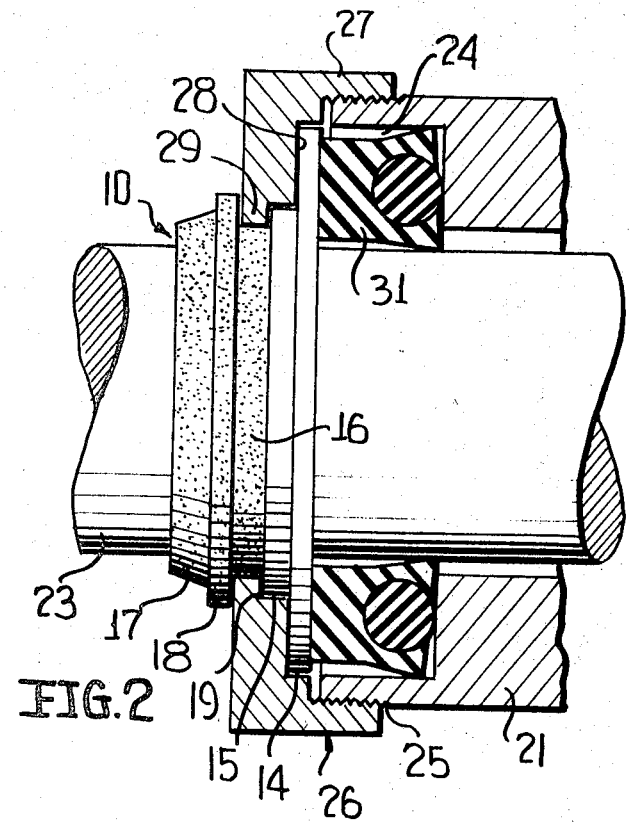
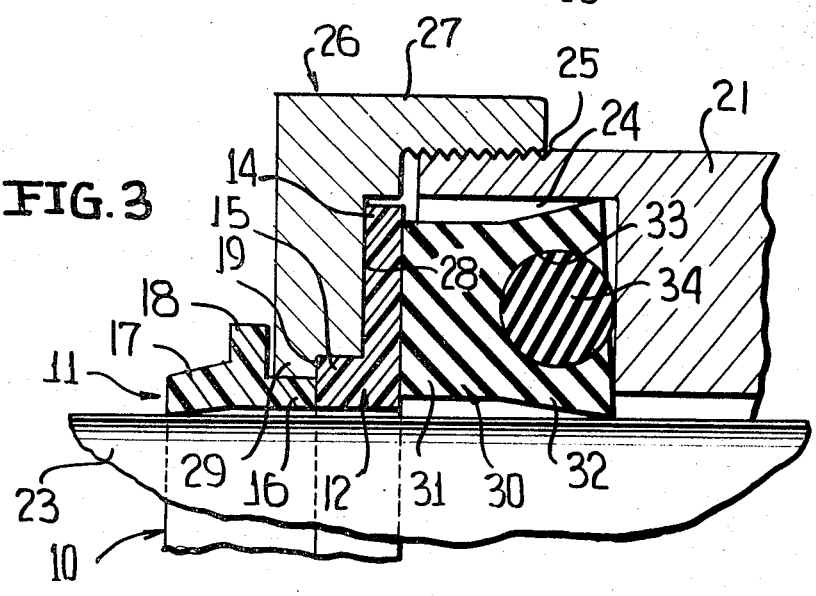
INVENTOR
NORMAN E. MILLSAP
By Diller, Brown, Ramik & Holt
ATTORNEYS

COMPOSITE ROD WIPER

This invention relates in general to improvements in seals and more particularly to an improved rod wiper.

Rod wipers must be formed of soft resilient abrasive-resistant material to perform the necessary sealing and wiping action. However, in the mounting and usage thereof the relatively soft material readily extrudes and fails to provide the necessary sealing engagement with a shaft.

Deficiencies of existing rod wipers may be overcome in accordance with this invention by uniting the rod wiper with a backup washer formed of relative hard extrusion-resistant material.

Another feature of this invention is the utilization of the backup washer for the mounting of rod wiper-backup washer assembly with the rod wiper, maintained by the backup washer, being free to perform the necessary sealing and wiping action.

Still another feature is the combinability of the rod wiper assembly with a clamping ring, the rod wiper being sufficiently resilient to be inserted into the clamping ring with the clamping ring being retained between the rod wiper and the backup washer.

A further feature of the rod wiper assembly is the usability of the backup washer thereof as clamping surface in conjunction with a shaft packing.

Still another feature of the rod wiper assembly is the forming of the backup washer and rod wiper of materials which may be readily bonded together in a manner wherein the physical properties of the assembly are no less than the lowest physical properties of the two.

With the above and other objects in view that will hereinafter appear, the nature of the invention will be more clearly understood by reference to the following detailed description, the appended claims and the several views illustrated in the accompanying drawing:

IN THE DRAWING

FIG. 1 is a perspective view of rod wiper assembly with parts broken away and shown in section.

FIG. 2 is an axial sectional view of a typical installation.

FIG. 3 is an enlargement of a portion of FIG. 2 shown in greater details.

The rod wiper assembly, identified as 10, includes a rod wiper portion 11 and a backup washer portion 12 joined together by a common bond 13. Backup washer 12 is formed of relatively hard extrusion-resistance plastic or rubberlike material while rod wiper 11 is formed of softer, more resilient, abrasion-resistant plastic or rubberlike materials. Bond 13 may be formed in any conventional manner with the physical properties thereof being no lower than the lowest physical property of either.

Backup washer 12 is L-shaped in radial section and includes annular portion 14 and cylindrical portion 15. Rod wiper 11, in radial section, includes cylindrical portion 16, conical portion 17 and annular portion 18, annular portion 18 being at the intersection of portions 16, 17.

Cylindrical portions 15, 16 are joined together by bond 13 with portion 16 being of a lesser external diameter than portion 15 and portion 15 having an exposed shoulder 19 opposing annular portion 18 and defining therewith an annular groove 20, facilitating the captive mounting of rod wiper assembly 10.

A typical rod wiper installation is shown in FIGS. 2, 3 and includes machine element 21 having bore 22 through which shaft or rod 23 extends. Machine element 21 defines a packing receiving cup 24 and is externally threaded at 25. L-shaped cross-sectional clamping ring 26 has cylindrical portion 27 telescoped over and threaded to machine element 21. Clamping ring 26 has shoulder 28 opposing cup 24 and projection 29.

U-shaped packing ring 30 having base 31 and bifurcated portion 32 is positioned in cup 24. Bifurcated portion 32 has recessed area 33 receiving packing expanding O-ring 34 which spreads bifurcated portion 32 into sealed engagement with rod 23 and machine element 21.

Rod wiper portion 11 is sufficiently resilient to collapse for insertion through clamping ring 26 and reception of projection 29 into groove 20. When installed, backup washer 12 engages packing base 31 to expand packing ring 30 with backup washer being clamped between packing ring 30 and shoulder 28 to position rod wiper assembly 10. Backup washer 12 both positions and maintains shape of rod wiper portion 11 which is supported only by backup washer 12 and possibly projection 29.

In use rod wiper portion 11 is permitted to function at higher unit pressures while being formed of a material which allows optimum rod-wiping action without generating excessive friction which results in heat buildup and wear.

Although only a preferred embodiment of the rod wiper assembly has been disclosed, minor variations may be made therein without departing from the spirit and scope of the invention as defined by the appended claims.

I claim:

1. A composite rod wiper assembly comprising a backup washer for a shaft seal and a rod wiper, said backup washer being permanently bonded to said rod wiper, said backup washer being formed of a hard material as compared to the material of said rod wiper and having first surface means remote from said rod wiper for engaging a shaft seal in backing up relation and second surface means for engaging a clamping ring to position said backup washer.

2. The assembly of claim 1 wherein an external annular groove is formed in said rod wiper for interlocking cooperation with a flange of a clamping ring, and said rod wiper being sufficiently flexible to snap over a clamping ring flange, whereby a clamping ring flange is readily received in said groove, and the location of said groove being one wherein only said rod wiper is required to be flexed for the mounting of said wiper assembly on a clamping ring.

3. The assembly of claim 1 wherein the bond between said backup washer and said rod wiper has physical properties at least equal to the lower properties of the materials from which said backup washer and said rod wiper are formed.

4. The assembly of claim 1 wherein the materials from which said backup washer and said shaft seal are formed are selected from rubber and rubberlike plastic materials.

5. The assembly of claim 1 wherein said backup washer is annular and has a shaft receiving opening therethrough, and said rod wiper has a resilient lip projecting into an extension of said opening remote from said backup washer.

6. The assembly of claim 1 together with a tubular member defining a recess for a seal member, a seal member seated in said recess, and a clamping ring cooperating with said tubular member for axial compressing and radially expanding said seal member, said clamping ring having said assembly mounted thereon with said backup washer being aligned with said recess with said first surface means in compressive engagement with said seal member and said second surface means clampingly engaged by said clamping ring.

7. The assembly of claim 6 wherein said backup washer is formed of a material sufficiently hard to resist extrusion thereof and the adjacent portion of said seal member under normal operating conditions.

8. The assembly of claim 6 wherein said backup washer is formed of a material sufficiently hard to resist extrusion thereof and the adjacent portion of said seal member under normal operating conditions, and said rod wiper is formed of material sufficiently soft to provide an optimum wiping action.

* * * * *